United States Patent
Yang et al.

(10) Patent No.: US 9,744,600 B2
(45) Date of Patent: Aug. 29, 2017

(54) ELECTRICALLY-ADJUSTABLE TOOL HOLDER

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Yang-Mao Peng, Jiashan (CN); Jian-Shi Jia, Jiashan (CN); Jing-Shuang Sui, Jiashan (CN); Zhen-Guang Xu, Jiashan (CN); Jie Li, Jiashan (CN)

(73) Assignees: FU DING ELECTRONICAL TECHNOLOGY (JIASHAN) CO., LTD., Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 81 days.

(21) Appl. No.: 14/711,951

(22) Filed: May 14, 2015

(65) Prior Publication Data
US 2016/0114405 A1  Apr. 28, 2016

(30) Foreign Application Priority Data
Oct. 24, 2014 (CN) .......................... 2014 1 0576564

(51) Int. Cl.
*B23B 31/02* (2006.01)
*B23B 31/28* (2006.01)
(Continued)

(52) U.S. Cl.
CPC ........... *B23B 31/028* (2013.01); *H02K 35/04* (2013.01); *B23B 31/28* (2013.01); *B23B 2260/10* (2013.01);
(Continued)

(58) Field of Classification Search
CPC ..... B23B 31/028; B23B 31/28; B23B 29/205; B23B 2231/0256; B23B 2260/10;
(Continued)

(56) References Cited

U.S. PATENT DOCUMENTS 3,471,724 A * 10/1969 Balamuth ............... H01L 41/12
                                                              310/26
4,864,265 A *  9/1989 Peoples ................. H01F 27/362
                                                              336/5
(Continued)

FOREIGN PATENT DOCUMENTS

| CH | 317376 A | * | 11/1956 | ............. B23B 37/00 |
|---|---|---|---|---|
| CN | 102568742 A | | 7/2012 | |
| CN | 104002205 A | | 8/2014 | |
| DE | 10343682 A1 | | 4/2005 | |
| DE | 102006038924 A1 | | 2/2008 | |
| GB | 1356528 A | * | 6/1974 | ........... B23B 31/201 |
| RU | 2250814 C1 | * | 4/2005 | |

OTHER PUBLICATIONS

Machine translation, RU2250814C1, "Ultrasonic Oscillation System for Dimension Working", Khmelev, V.N. et al., Apr. 2005.*

*Primary Examiner* — Eric A Gates
*Assistant Examiner* — Chwen-Wei Su
(74) *Attorney, Agent, or Firm* — Steven Reiss

(57) ABSTRACT

An electrically-adjustable tool holder precisely movable in a straight line within a magnetic field under electrical stimulation includes a handle body, a connecting member, and a driving member. The connecting member has a first end securely coupled to an end of the handle body, a second end opposite to the first end, and defines a through hole passing through the first end and the second end. The driving member includes a magnet securely received in the through hole, and an electrical electric coil movably received in the magnet. The electric coil is configured to be securely coupled to the tool, and moves the tool up or down along the central axis of the handle body.

10 Claims, 4 Drawing Sheets

(51) Int. Cl.
*H02K 35/04* (2006.01)
*B23Q 16/00* (2006.01)

(52) U.S. Cl.
CPC ..... *B23B 2270/022* (2013.01); *B23B 2270/10* (2013.01); *B23B 2270/38* (2013.01); *B23Q 16/003* (2013.01); *Y10T 279/17991* (2015.01); *Y10T 279/23* (2015.01); *Y10T 279/3487* (2015.01); *Y10T 408/23* (2015.01)

(58) Field of Classification Search
CPC .......... B23B 2270/022; B23B 2270/34; B23B 2270/38; B23B 2270/60; B23B 37/00; B23B 2270/10; Y10T 279/17991; Y10T 279/23; Y10T 279/3487; Y10T 408/23; B23Q 16/003
See application file for complete search history.

(56) References Cited

U.S. PATENT DOCUMENTS

| | | | |
|---|---|---|---|
| 6,227,853 B1* | 5/2001 | Hansen | A61C 1/148 279/128 |
| 2003/0001456 A1* | 1/2003 | Kauf | B06B 3/00 310/323.18 |
| 2005/0188798 A1 | 9/2005 | Bischof et al. | |
| 2008/0041604 A1* | 2/2008 | Sauer | B23B 31/02 173/217 |
| 2008/0224423 A1* | 9/2008 | Hangleiter | B23B 31/265 279/4.12 |
| 2010/0026104 A1* | 2/2010 | Jajtic | H02K 41/031 310/12.22 |
| 2016/0144473 A1* | 5/2016 | Fronius | B23B 31/02 279/126 |

* cited by examiner

ELECTRICALLY-ADJUSTABLE TOOL HOLDER

FIELD

The subject matter herein generally relates to a tool presentation.

BACKGROUND

During the machining process of a work piece, a milling cutter is usually held by a tool holder to cut the work piece.

BRIEF DESCRIPTION OF THE DRAWINGS

Implementations of the present technology will now be described, by way of example only, with reference to the attached figures.

DETAILED DESCRIPTION

Figure 1:
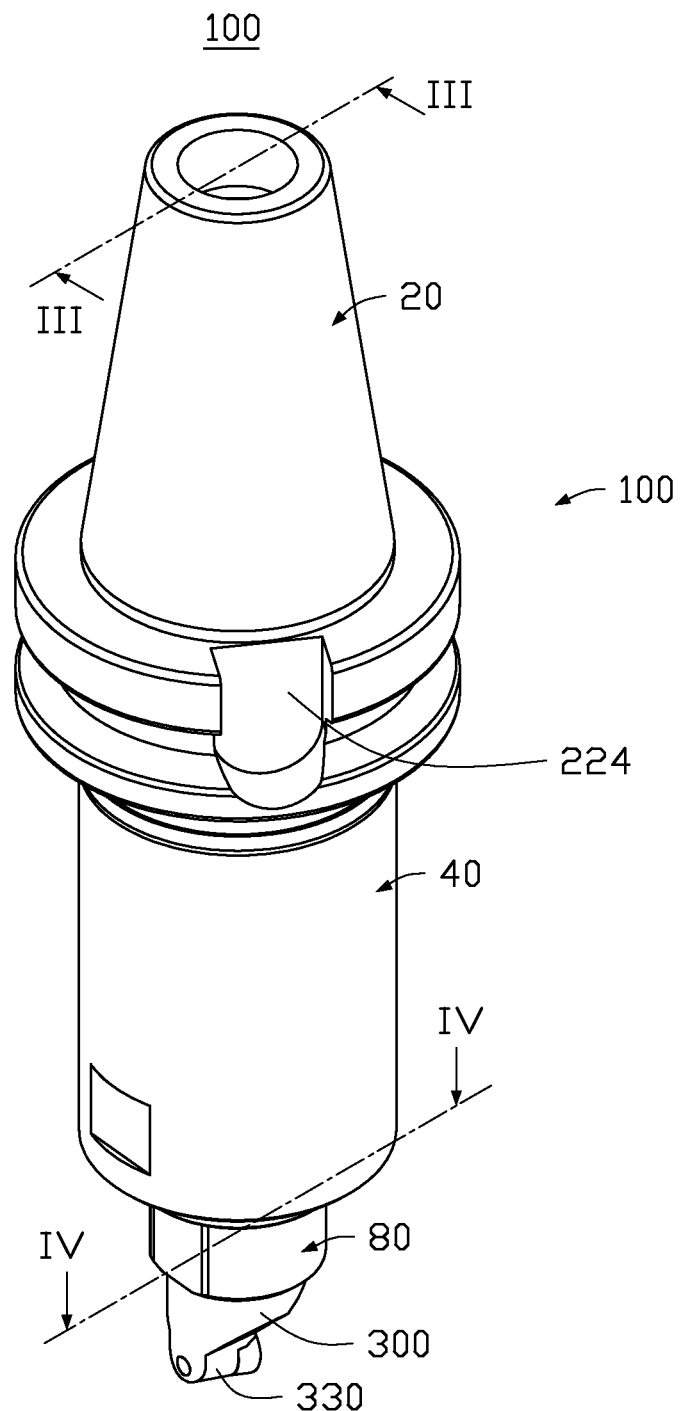
FIG. 1 is an isometric view of an embodiment of an electrically-adjustable tool holder with a tool.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

An electrically-adjustable tool holder configured for holding a tool can include a handle body, a connecting member, and a driving member. The connecting member can have a first end securely coupled to an end of the handle body, a second end opposite to the first end, and can define a through hole passing through the first end and the second end. The driving member can include a magnet securely received in the through hole, and an electric coil movably received in the magnet. The electric coil can be securely coupled to the tool, and move the tool up or down along the central axis of the handle body in the magnet when electrically stimulated.

Figure 2:
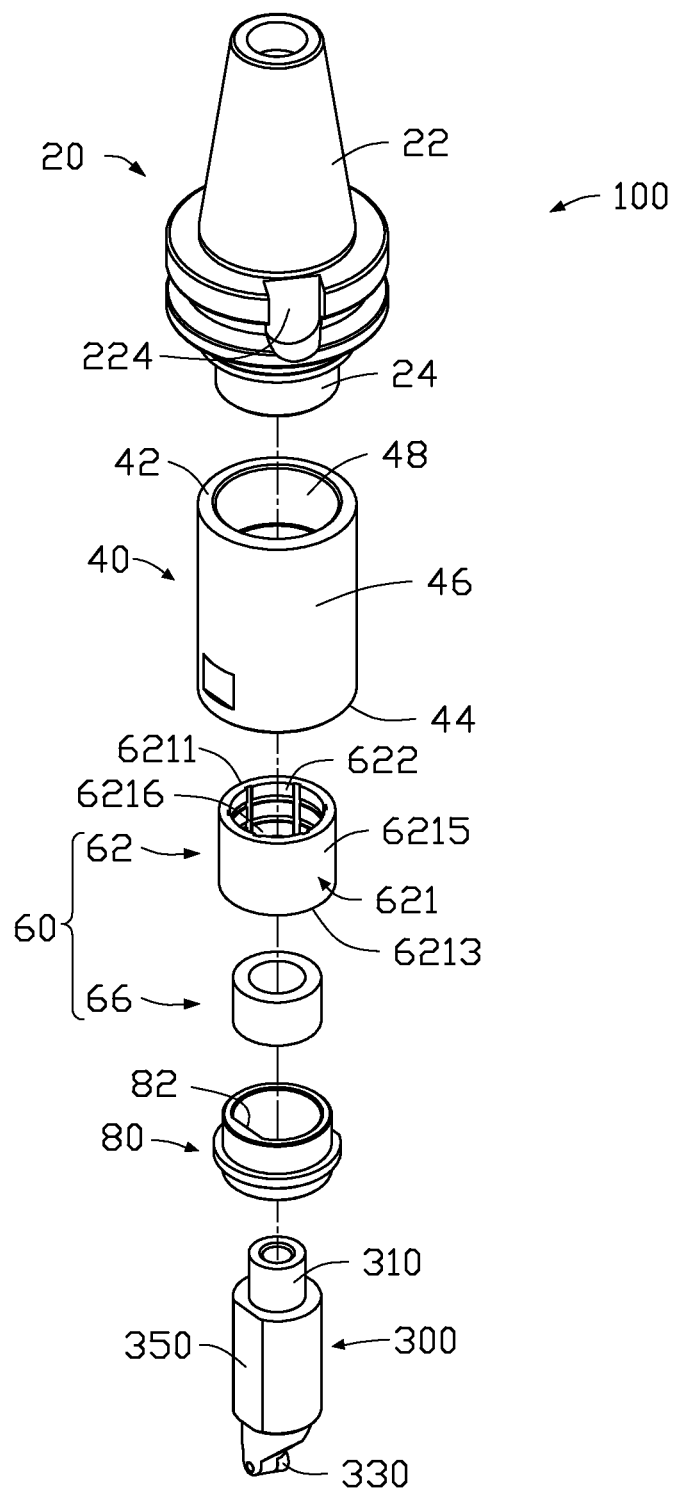
FIG. 2 is an exploded, isometric view of the electrically-adjustable tool holder with the tool of FIG. 1.

FIGS. 1 and 2 illustrate an embodiment of an electrically-adjustable tool holder 100 which precisely moves in a straight line within a magnetic field under electrical stimulation. The electrically-adjustable tool holder 100 can be configured for holding a tool 300. The electrically-adjustable tool holder 100 can include a handle body 20, a connecting member 40, a driving member 60, and a guide member 80. The driving member 60 and the guide member 80 can be received in the connecting member 40, and spaced away from each other. The handle body 20 can be securely coupled to an end of the connecting member 40.

Figure 3:
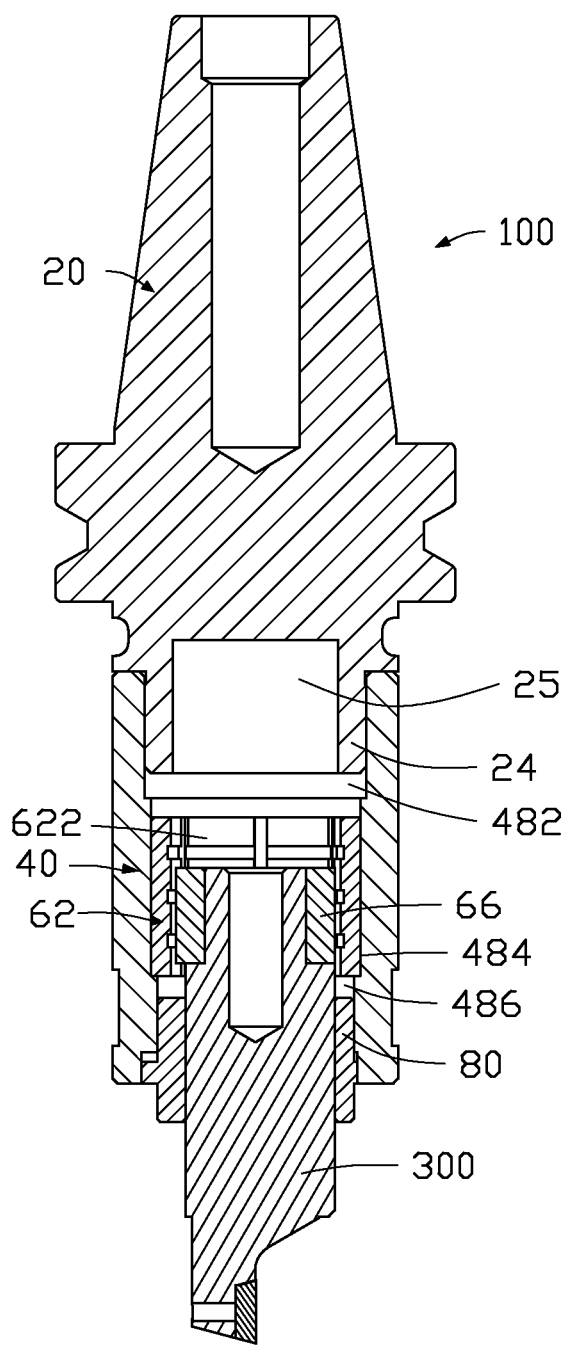
FIG. 3 is a cross-sectional view, taken along line III-III of FIG. 1.
Figure 4:
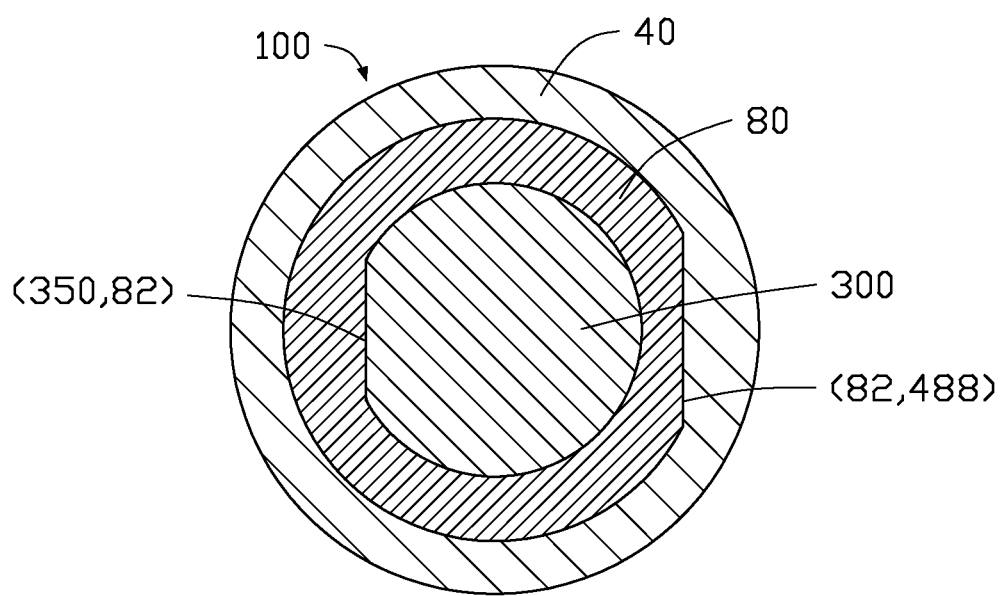
FIG. 4 is a cross-sectional view, taken along line IV-IV of FIG. 1.

FIGS. 2 to 4 illustrate that the connecting member 40 can be substantially hollow and cylindrical. The connecting member 40 can include a first end 42, a second end 44 opposite to the first end 42, and a sidewall 46 interconnecting the first end 42 and the second end 44. The connecting member 40 can define a through hole 48 which passes through the first end 42 and the second end 44. The through hole 48 can extend along the central axis of the connecting member 40. The through hole 48 can include a first connecting hole 482, a second connecting hole 484, and a third connecting hole 486, in that order. The first connecting hole 482 can be located adjacent to the first end 42, and the third connecting hole 486 can be located adjacent to the second end 44. A diameter of the first connecting hole 482 can be greater than that of the second connecting hole 484, and the diameter of the second connecting hole 484 can be greater than that of the third connecting hole 486. A latching portion 488 can be formed on the inner surface of the third connecting hole 486. In at least one embodiment, the latching portion 488 can be substantially flat.

The handle body 20 can include a mounting portion 22, and a connecting portion 24 extending from one end of the mounting portion 22. The handle body 20 can define a receiving hole 25 passing through the connecting portion 24. The mounting portion 22 can be configured to be coupled to the main shaft of a machine (not shown), thus the main shaft can move the electrically-adjustable tool holder 100 up or down toward a workpiece located on the machine. The mounting portion 22 can define a mounting groove 224 on the outer surface for coupling the main shaft. The connecting portion 24 can be securely received in the first connecting hole 482, and can resist the inner surface of the through hole 48 of the connecting member 40, thus the receiving hole 25 can communicate with the first connecting hole 48. In another embodiment, the connecting portion 24 does not need to be received in the first connecting hole 482, as long as the connecting portion 24 is securely coupled to the connecting member 40

The driving member 60 can be securely received in the second connecting hole 484, and spaced a predetermined distance from the connecting portion 24. The driving member 60 can include a magnet 62 and a matching electric coil 66. The magnet 62 can include a loading body 621, and a plurality of magnetic plates 622. The loading body 621 can be substantially hollow and cylindrical, and can be securely received in the second connecting hole 484. The loading body 621 can include a first end 6211, a second end 6213 opposite to the first end 6211, and a sidewall 6215 interconnecting the first end 6211 and the second end 6213. The loading body 621 can define a holding hole 6216 therein along the central axis of the loading body 621. The holding hole 6216 can pass through the first loading end 6211 and the second loading end 6213. The magnetic plates 622 can be mounted on the inner surface of the holding hole 6216, and spaced away from each other, around the central axis of the loading body 621. The magnet 62 can be such that one end surface acts as an N-pole and the opposite end surface acts as an S-pole. The electric coil 66 can be movably received in the holding hole 6216, and securely coupled to the tool 300. In at least one embodiment, the electric coil 66 can be a three-phase wound coil.

The guide member 80 can be securely and partially received in the third connecting hole 486, can partially extend out of the connecting member 40, and can be configured for guiding and receiving the tool 300. In at least one embodiment, the guide member 80 can be completely received in the third connecting hole 486. The guide member 80 can be hollow and cylindrical. The guide member 80 can define two locking portions 82, on the outer surface and inner surface. Each locking portion 82 can be substantially flat. One locking portion 82 defined on the outer surface can resist the latching portion 488 to prevent rotation of the guide member 80 in the third connecting hole 486. In at least one embodiment, the locking portions 82 and the latching portion 488 can be omitted, so long as the guide member 80 can be securely received in the connecting member 40. In at least one embodiment, the central axis of the guide member 80, the central axis of the driving member 60, and the central axis of the connecting member 40 can coincide with the central axis of the handle body 20.

The tool 300 can include a tool body 310, and a tool nose 330 formed on an end of the tool body 310. The tool body 310 can be substantially cylindrical, and can define a fixing portion 350 matching with the locking portion 82 on the outer surface. The fixing portion 350 can be substantially flat, and configured to resist the locking portion 82 defined on the inner surface of the guide member 80, to prevent the tool 300 rotating in the guide member 80.

When in use, the tool 300 can be movably received in the guide member 80 and securely coupled to the electric coil 66. When the electric coil 66 is charged with electricity, the electric coil 66 can move the tool 300 up or down along the central axis of the connecting member 40 in the connecting member 40 under the magnetic field of the magnet 62. During testing, the instantaneous velocity of the tool nose 330 of the tool 300 mounted on the electrically-adjustable tool holder 100 can be many times more than that of the tool 300 driven manually or by gears.

In at least one embodiment, the magnet 62 can be located adjacent to the handle body 20, so long as the electric coil 66 can move up or down along the central axis of the magnet 62 in the magnet 62. In at least one embodiment, the connecting member 40 can be integrated with the connecting portion 24, so long as the magnet 62 is securely received in the handle body 20. When the tool 300 is movably received in the handle body 20 and securely coupled to the electric coil 66, the electric coil 66 can move the tool 300 up or down along the central axis of the handle body 20. In at least one embodiment, the guide member 80 can be omitted, so long as the tool 300 can move in the handle body 20 or in the connecting member 40.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. An electrically-adjustable tool holder configured for holding a tool and comprising:
   a handle body;
   a connecting member with a first end securely coupled to an end of the handle body and a second end opposite to the first end, the connecting member defining a through hole passing through the first end and the second end; and
   a driving member comprising:
   a magnet securely received in the through hole, and
   an electric coil movably received in the magnet and securely coupled to the tool, wherein the electric coil is configured to move the tool up or down along a central axis of the handle body in the magnet when electrically stimulated,
   wherein the magnet comprises:
   a loading body comprising a first end, a second end opposite to the first end, and a sidewall interconnecting the first end and the second end, and defining a holding hole space with an inner surface in the loading body extending from the first loading end into the loading body toward the second loading end, and
   a plurality of magnetic plates mounted on the inner surface of the holding hole;
   the electric coil is movably received in the holding hole.

2. The electrically-adjustable tool holder of claim 1, wherein the handle body is partially received in the through hole, and spaced a predetermined distance from the magnet.

3. The electrically-adjustable tool holder of claim 1, wherein the handle body comprises a mounting portion, and a connecting portion extending from an end of the mounting portion and securely received in the through hole.

4. The electrically-adjustable tool holder of claim 3, wherein the connecting portion defines a receiving hole communicating with the through hole.

5. The electrically-adjustable tool holder of claim 3, wherein the mounting portion defines a mounting groove on the outer surface thereof.

6. The electrically-adjustable tool holder of claim 1, wherein the electric coil is a three-phase wound coil.

7. The electrically-adjustable tool holder of claim 1, wherein the magnetic plates are spaced away from each other, around the central axis of the loading body.

8. The electrically-adjustable tool holder of claim 1, wherein the electrically-adjustable tool holder further comprises a guide member which is at least partially received in the through hole, the guide member is configured for guiding the tool.

9. The electrically-adjustable tool holder of claim 8, wherein the guide member defines a locking portion on the outer surface thereof, the connecting member defines a latching portion matching with the locking portion on the inner surface of the through hole, the latching portion resists the locking portion.

10. The electrically-adjustable tool holder of claim 9, wherein the through hole includes a first connecting hole, a second connecting hole, and a third connecting hole, in that order; a diameter of the first connecting hole is greater than that of the second connecting hole, the diameter of the second connecting hole is greater than that of the third connecting hole; the handle body is partially received in the first connecting hole, the magnet is securely received in the second connecting hole, and the guide member is partially received in the third connecting hole.

* * * * *